(12) United States Patent
Mooney

(10) Patent No.: US 8,731,569 B2
(45) Date of Patent: *May 20, 2014

(54) CELL PHONE EXTENSION USING WIRELESS PICONET

(71) Applicant: Agere Systems LLC, Allentown, PA (US)

(72) Inventor: Philip D. Mooney, Sellersville, PA (US)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/826,867

(22) Filed: Mar. 14, 2013

(65) Prior Publication Data

US 2013/0281099 A1    Oct. 24, 2013

Related U.S. Application Data

(63) Continuation of application No. 12/000,479, filed on Dec. 13, 2007, now Pat. No. 8,478,281, which is a continuation of application No. 09/805,195, filed on Mar. 14, 2001, now Pat. No. 7,363,006.

(51) Int. Cl.
*H04W 40/00* (2009.01)

(52) U.S. Cl.
USPC .......................................... 455/448; 370/338

(58) Field of Classification Search
USPC ................... 455/11.1, 448; 370/338
See application file for complete search history.

(56) References Cited

U.S. PATENT DOCUMENTS

| 5,003,589 | A | 3/1991 | Chen |
| 5,267,261 | A | 11/1993 | Blakeney, II et al. |
| 5,675,629 | A | 10/1997 | Raffel et al. |
| 5,697,062 | A | 12/1997 | Hendrickson |
| 5,913,163 | A | 6/1999 | Johansson |

(Continued)

FOREIGN PATENT DOCUMENTS

WO    WO0148977 A2    7/2001

OTHER PUBLICATIONS

Advisory Action received in U.S. Appl. No. 09/805,195 (Filing Date: Mar. 14, 2001) dated Oct. 6, 2004.

(Continued)

*Primary Examiner* — Marcos Batista
(74) *Attorney, Agent, or Firm* — Mendelsohn, Drucker & Dunleavy, P.C.; David L. Cargille; Steve Mendelsohn

(57) ABSTRACT

In accordance with the principles of the present invention utilizing the BLUETOOTH specification Cordless Telephony profile, incoming calls to a cell phone including a Gateway role can be routed to another piconet device (e.g., another cell phone including a Terminal role. Two cell phones with BLUETOOTH capability each include the Cordless Telephony Profile. The cell phone receiving the call acts as a PSTN cordless telephone Gateway cell phone via the cellular network, while the other cell phone acts as a cordless telephone Terminal cell phone. The cordless telephone Terminal cell phone then acts as an extension to the Gateway cell phone allowing both calls to the Gateway cell phone to be answered at the Terminal cell phone, and even allowing calls by the Gateway cell phone to be originated by the Terminal cell phone.

26 Claims, 3 Drawing Sheets

(56) References Cited

U.S. PATENT DOCUMENTS

| | | | |
|---|---|---|---|
| 5,978,689 | A | 11/1999 | Tuoriniemi et al. |
| 6,006,115 | A | 12/1999 | Wingate |
| 6,078,825 | A | 6/2000 | Hahn et al. |
| 6,134,437 | A | 10/2000 | Karabinis et al. |
| 6,208,876 | B1 | 3/2001 | Raussi et al. |
| 6,339,706 | B1 | 1/2002 | Tillgren et al. |
| 6,405,027 | B1 | 6/2002 | Bell |
| 6,535,498 | B1 | 3/2003 | Larsson et al. |
| 6,600,902 | B1 | 7/2003 | Bell |
| 6,614,350 | B1 | 9/2003 | Lunsford et al. |
| 6,647,426 | B2 | 11/2003 | Mohammed |
| 6,697,638 | B1 | 2/2004 | Larsson et al. |
| 6,804,532 | B1 | 10/2004 | Moon et al. |
| 7,050,558 | B1 | 5/2006 | Pershan et al. |
| 7,171,221 | B1 | 1/2007 | Amin et al. |
| 7,502,615 | B2 | 3/2009 | Wilhoite et al. |
| 2002/0147008 | A1 | 10/2002 | Kallio |
| 2003/0026240 | A1 | 2/2003 | Eyuboglu et al. |
| 2004/0072593 | A1 | 4/2004 | Robbins et al. |
| 2004/0264410 | A1 | 12/2004 | Sagi et al. |
| 2004/0266426 | A1 | 12/2004 | Marsh et al. |
| 2006/0045056 | A1 | 3/2006 | O'Hara Jr. |
| 2006/0072542 | A1 | 4/2006 | Sinnreich et al. |
| 2006/0116127 | A1 | 6/2006 | Wilhoite et al. |
| 2006/0121916 | A1 | 6/2006 | Aborn et al. |
| 2006/0126565 | A1 | 6/2006 | Shaheen |
| 2006/0205436 | A1 | 9/2006 | Liu et al. |
| 2006/0246903 | A1 | 11/2006 | Kong et al. |
| 2007/0002844 | A1 | 1/2007 | Ali |
| 2007/0008928 | A1 | 1/2007 | Kezys |
| 2007/0049274 | A1 | 3/2007 | Yacobi et al. |
| 2007/0049276 | A1 | 3/2007 | Rimoni et al. |
| 2007/0049329 | A1 | 3/2007 | Mayer et al. |
| 2007/0070948 | A1 | 3/2007 | Kezys et al. |
| 2007/0207804 | A1 | 9/2007 | Sharma et al. |

OTHER PUBLICATIONS

Advisory Action received in U.S. Appl. No. 09/805,195 (Filing Date: Mar. 14, 2001) dated Jan. 19, 2006.

Final Office Action received in U.S. Appl. No. 09/805,195 (Filing Date: Mar. 14, 2001) dated Jun. 14, 2004.

Final Office Action received in U.S. Appl. No. 09/805,195 (Filing Date: Mar. 14, 2001) dated Jul. 14, 2005.

Non-Final Office Action received in U.S. Appl. No. 09/805,195 (Filing Date: Mar. 14, 2001) dated Jul. 16, 2007.

Non-Final Office Action received in U.S. Appl. No. 09/805,195 (Filing Date: Mar. 14, 2001) dated Jan. 16, 2004.

Non-Final Office Action received in U.S. Appl. No. 09/805,195 (Filing Date: Mar. 14, 2001) dated Feb. 24, 2005.

Non-Final Office Action recieved in U.S. Appl. No. 09/805,195 (Filing Date: Mar. 14, 2001) dated Jun. 6, 2006.

Non-Final Office Action recieved in U.S. Appl. No. 09/805,195 (Filing Date: Mar. 14, 2001) date Jan. 12, 2007.

Notice of Allowability receive in U.S. Appl. No. 09/805,195 (Filing Date: Mar. 14, 2001) dated Nov. 2, 2007.

Specification of the Bluetooth System, version 1.0B, Profiles, Part K:3, Cordless Telephony Profile, p. 95-138, Dec. 1, 1999.

Specification of Bluetooth System, version1.0B, CORE, vol. 1, part B, section 10.9, Scatternet, dated Nov. 29, 1999 and Dec. 1, 1999, pp. 122-125.

Non-Final Office Action received in U.S. Appl. No. 12/000,479 (Filing Date: Dec. 13, 2007) dated Sep. 2, 2010.

Final Office Action received in U.S. Appl. No. 12/000,479 (Filing Date: Dec. 13, 2007) dated Mar. 3, 2011.

Non-Final Office Action received in U.S. Appl. No. 12/000,479 (Filing Date: Dec. 13, 2007) dated Oct. 28, 2011.

Notice of Allowance recieved in U.S. Appl. No. 12/000,479 (Filing Date: Dec. 13, 2007) dated Nov. 21, 2012.

CELL PHONE EXTENSION USING WIRELESS PICONET

CROSS-REFERENCE TO RELATED APPLICATIONS

This is a continuation of co-pending application Ser. No. 12/000,479, filed Dec. 13, 2007, which is a continuation of application Ser. No. 09/805,195, filed Mar. 14, 2001 and issued as U.S. Pat. No. 7,363,006, the teachings of which applications are incorporated herein by reference in their entirety.

BACKGROUND OF THE INVENTION

1. Field of the Invention

The present invention relates to piconet wireless networks. More particularly, it relates to the implementation of a cell phone extension using BLUETOOTH piconet type cordless telephone profile communications.

2. Background of Related Art

Cell phones are typically configured so that one phone is associated to one phone number. When a caller calls the cell phone, the user must locate the called cell phone, and answer the incoming call.

There are times, however, when the user is not in a convenient position to answer a ringing cell phone, or in a convenient position to have someone else (e.g., a co-worker or family member) answer the cell phone for them. For instance, if a cell phone rings in a meeting, the user may not want to disrupt the meeting to answer the call. In such a case, it might be more convenient to have someone outside the meeting answer the telephone call, e.g., a secretary, receptionist, etc.

As another example, a wife's cell phone may ring while it sits in her briefcase in the back seat of a car. Her husband has his own cell phone, but at a different telephone number. Conventional techniques allow the wife to forward all telephone calls to her husband's cell phone until otherwise instructed.

As yet another example, a manager may be making a presentation to a large group when his cell phone starts ringing. Neither he nor an assistant can make it to the cell phone without interrupting the meeting. Using conventional techniques, the manager should have called the service provider to arrange for call forwarding of all incoming telephone calls to another phone before he entered the meeting.

Conventionally, call forwarding convenience is provided by a service provider such as a telephone company. FIG. 3 depicts call forwarding in a conventional cell phone scenario.

In particular, as shown in FIG. 3, a wireless network 310 includes a first cellular telephone 302 and a second cellular telephone 304. In accordance with a preset call forwarding arrangement 330, an incoming telephone call from a wireless or landline phone 320 to the second cellular telephone 304 is forwarded to the first cellular telephone 302 using the preset call forwarding arrangement 330.

Call forwarding is a revenue generating feature often provided for a fee by a telephone company (wireless or landline) To activate call forwarding, a user typically must call their service provider (be it wireless and/or landline) and provide a single telephone number to forward all calls to for a particular telephone number.

If the user desires the calls to be forwarded to another telephone number, then they must call the service provider again and ask that the call forward number be changed. While this is convenient, it lends itself to more static scenarios. Thus, such preset arrangement and payment for call forwarding is useful for longer term situations (e.g., user will be out of office for a week, etc.) and is less practical for quick, spur of the moment type situations (e.g., ad hoc meeting).

Moreover, calls may be forwarded to only one other telephone number. There is no provision in conventional call forwarding techniques which allows forwarding to more than one telephone number simultaneously allowing any of a plurality of other telephone numbers to answer an incoming telephone call to a particular cellular telephone.

Also, from a service provider's perspective, it is preferred that an incoming call be answered, rather than simply forwarded to voice mail, so as to incur billable air time.

Accordingly, there is a need for a quick and efficient cellular telephone feature which allows arrangement for an incoming call to one cellular telephone to be answered by any of a plurality of other devices in a more real time environment.

SUMMARY OF THE INVENTION

In accordance with the principles of the present invention, a cellular telephone comprises a cellular telephone module, a piconet front end, and a cordless telephone PSTN gateway role, in communication with the cellular telephone module and with the piconet front end. The cordless telephone PSTN gateway role allows a remote piconet device to answer an incoming call to the cellular telephone over a piconet network.

A method of remotely answering an incoming call to a cellular telephone over a wireless piconet network in accordance with another aspect of the present invention comprises establishing a piconet network including the cellular telephone and a remote piconet device. Audio is routed from the cellular telephone to the remote piconet device over the wireless piconet network.

A method of allowing a remote piconet device answer an incoming call to a wireless telephone in communication with said piconet device in accordance with yet another aspect of the present invention comprises passing incoming call information from the wireless telephone receiving an incoming call, to the remote piconet device over a wireless piconet, and audibly ringing the remote piconet device in response to receipt of the incoming call information by the wireless telephone.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
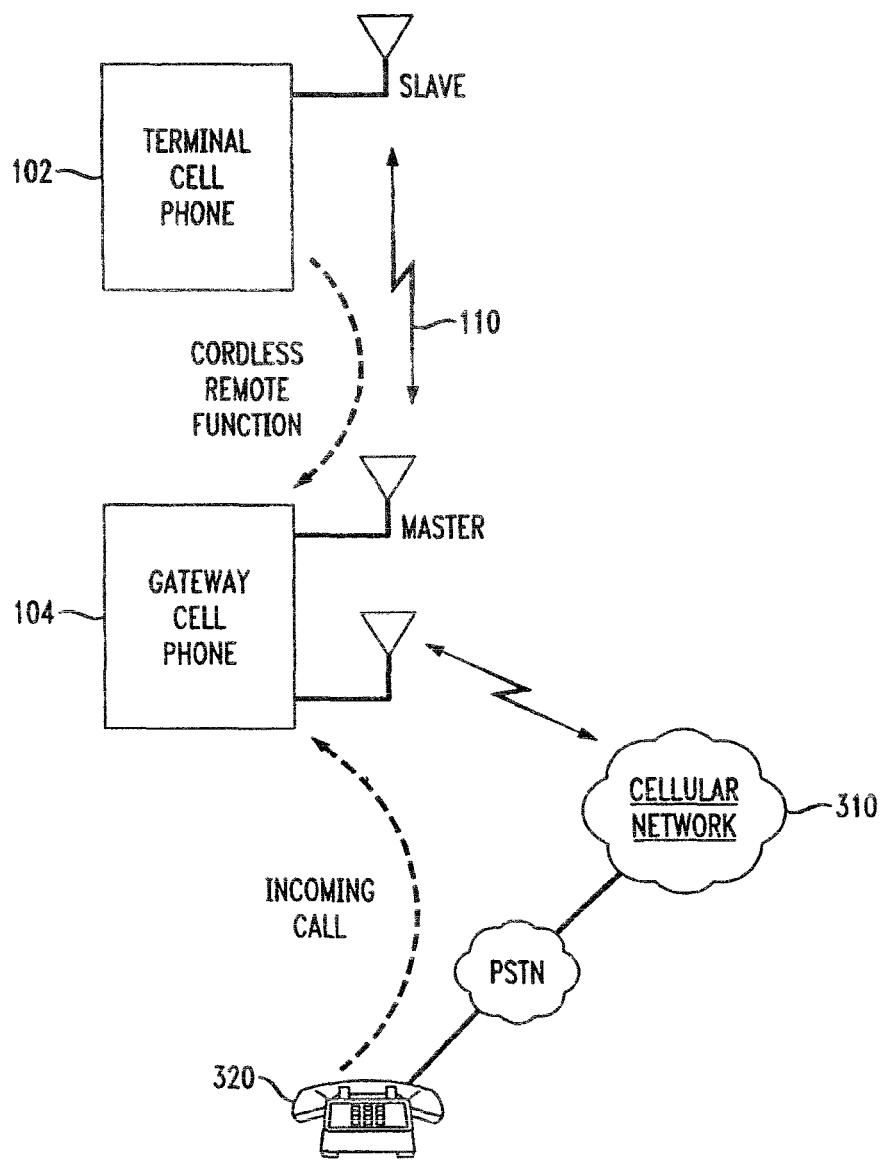
FIG. 1 shows one cellular telephone (a terminal) answering an incoming telephone call to another cellular telephone (a gateway) using audio and control transmitted over a wireless piconet (e.g., BLUETOOTH using cordless telephone profile techniques, in accordance with the principles of the present invention.

Piconets, or small wireless networks, are being formed by more and more devices in many homes and offices. In particular, a popular piconet standard is commonly referred to as a BLUETOOTH piconet. Piconet technology in general, and BLUETOOTH technology in particular, provides peer-to-peer communications over short distances.

The wireless frequency of piconets may be 2.4 GHz as per BLUETOOTH standards, and/or typically have a 20 to 100 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH protocols. BLUETOOTH network technology may be utilized to implement a wireless piconet network connection (including scatternet). The BLUETOOTH standard for wireless piconet networks is well known, described in the BLUETOOTH specification, version 1.0, publicly available from the web site www.bluetooth.com. The entire BLUETOOTH specification (core and profiles), version 1.0, is explicitly incorporated herein by reference.

The BLUETOOTH specification defines a Cordless Telephony Profile. In particular, Part K:3 of the BLUETOOTH specification version 1.0B, Profiles, pages 96-138, defines the features and procedures that are required for interoperability between different cordless telephones, e.g., between remote handsets and corresponding base units. The BLUETOOTH specification is incorporated herein in its entirety by reference, as is the Cordless Telephony Profile portion of the Profiles.

The '3-in-1' phone is a solution for providing an extra mode of operation to cellular phones, using BLUETOOTH as a short-range bearer for accessing fixed network telephony services via a base station. The 3 functions include making calls via a base station (i.e., cordless telephone mode), making direct intercom calls between two terminals (e.g., between two cellular telephones), and, of course, providing cellular telephone services.

The Cordless Telephony Profile defines two roles: Gateway (GW) and Terminal (TL). The Gateway acts as a terminal endpoint from the external network point of view and handles all Interworking towards that network. The Gateway is the central point with respect to external calls, which means that it handles all call set-up requests to/from the external network. The Terminal is the wireless user terminal (e.g., the remote handset of a cordless telephone). The Cordless Telephony profile supports a small number (i.e., less than 7) of terminals, or 3 active voice terminals.

In accordance with the principles of the present invention utilizing the BLUETOOTH specification Cordless Telephony profile, incoming calls to a cell phone including a Gateway role can be routed to another piconet device (e.g., another cell phone including a Terminal role.

In accordance with the principles of the present invention, two cell phones with BLUETOOTH capability each have the Cordless Telephony Profile. The one receiving the call acts as a PSTN cordless telephone Gateway cell phone via the cellular network, while the other one acts as a cordless telephone Terminal cell phone. The cordless telephone Terminal cell phone then acts as an extension to the Gateway cell phone allowing both calls to the Gateway cell phone to be answered at the Terminal cell phone, and even allowing calls by the Gateway cell phone to be originated by the Terminal cell phone.

Moreover, the present invention includes the ability for any one of a number of authorized Terminal devices (e.g., Terminal cell phone) to answer an incoming call to a Gateway cell phone 'on the fly' after hearing the ringing at the Gateway cell phone.

For instance, FIG. 1 shows one cellular telephone (a terminal) answering an incoming telephone call to another cellular telephone (a gateway) using audio and control transmitted over a wireless piconet (e.g., BLUETOOTH piconet) using cordless telephone profile techniques, in accordance with the principles of the present invention.

In particular, as shown in FIG. 1, an incoming telephone call from an external source (e.g., landline phone 320) proceeds through the cellular network 310 and is routed by the cellular network to a Gateway cell phone 104. The cellular network need not be cognizant of the remote answering of the Gateway cell phone 104 in that the cellular network will continue to route the incoming telephone call to the Gateway cell phone 104, even though a Terminal cell phone 102 will act as a cordless telephone remote handset using the Cordless Telephony profile of the BLUETOOTH specification and remotely answer the incoming telephone call over a wireless piconet network 110 (e.g., a BLUETOOTH piconet network) between the Gateway cell phone 104 and the Terminal cell phone 102.

The BLUETOOTH specification suggests that a cell phone be given the ability to be a Cordless Telephone Terminal (See Profiles pp. 100 ff. Version 1.0 B). However, in addition, the present invention provides a cell phone with a Gateway role.

The extension phone need not be another cell phone as shown in FIG. 1, but rather could be any BLUETOOTH device including a Terminal role. For instance, the Terminal device may be, e.g., a cordless telephone, a computer (e.g., PC), a personal data assistant (PDA), or even an advanced headset.

Figure 2:
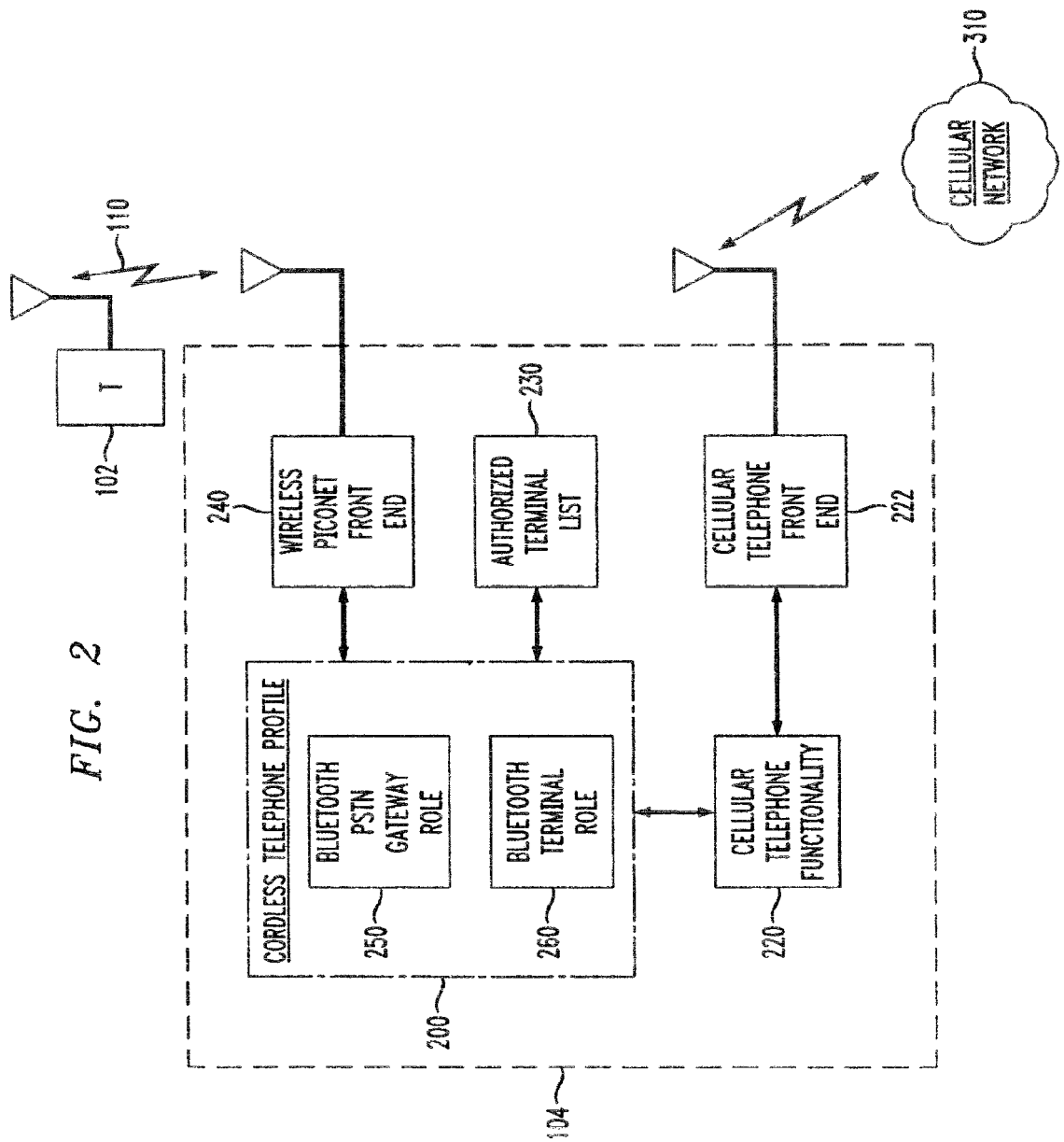
FIG. 2 shows a cellular telephone including both a PSTN Gateway role and a Terminal role as defined in the Cordless Telephony profile of the BLUETOOTH specification, version 1.0, in accordance with the principles of the present invention.
Figure 3:
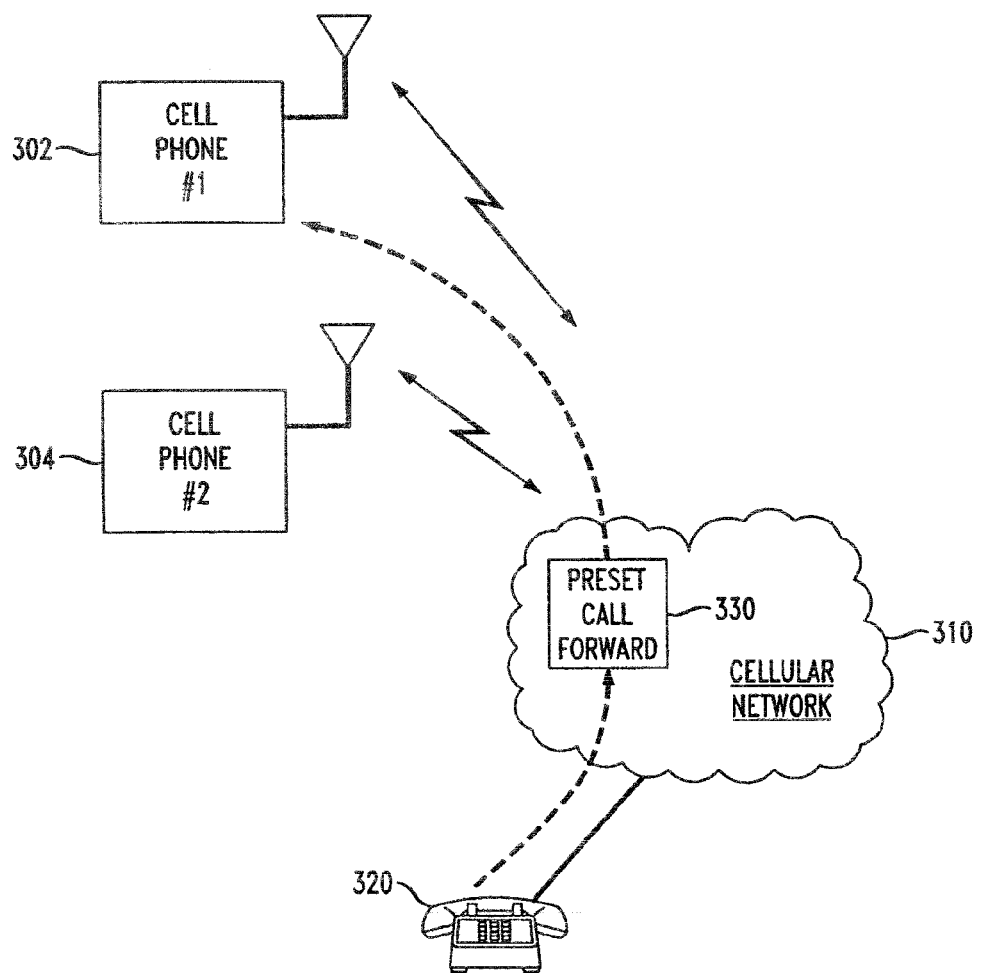
FIG. 3 depicts call forwarding in a conventional cell phone scenario.

FIG. 2 shows a cellular telephone including both a PSTN Gateway role and a Terminal role as defined in the Cordless Telephony profile of the BLUETOOTH specification, version 1.0, in accordance with the principles of the present invention. Thus, as shown in FIG. 2, both the Gateway role 250 and the Terminal role 260 of a cordless telephone profile module 200 in accordance with the BLUETOOTH specification, version 1.0, are included in the Gateway cell phone 104.

In particular, as shown in FIG. 2, a Gateway cell phone 104 includes both a wireless piconet front end 240 and a cellular telephone front end 222, as well as otherwise conventional cellular telephone functionality 220. The wireless piconet front end 240 provides wireless communications with a wireless piconet 110 in an otherwise conventional fashion. Similarly, the cellular telephone front end 222 provides cellular communications (e.g., answering incoming telephone calls) in an otherwise conventional fashion.

An audio path is established between the cellular telephone functionality and the cordless telephone profile, allowing a telephone call with the Gateway cell phone 104 to be supported with cordless telephone features (e.g., remote answering, remote conversation, etc.) controlled by the Terminal 102. Audio is passed between the Gateway cell phone 104 and the Terminal 102 over the piconet network 110 using, e.g., BLUETOOTH audio as defined in the BLUETOOTH specification, version 1.0.

When remotely answered, the Gateway cell phone 104 is directed by the Terminal 102 to answer the incoming telephone call in an otherwise normal way, but diverting its audio and control to the Terminal 102. The Gateway cell phone 104 may mute its microphone and/or speaker as desired in particular applications and/or as configured either by a manufacturer or by a user.

The Gateway cell phone 104 preferably allows any authorized one of a plurality of Terminal devices participating in the wireless piconet network 110 to remotely answer an incoming telephone call. Preferably, a list of authorized Terminal devices permitted by the user of the Gateway cell phone 104 to remotely answer any incoming telephone call is maintained in an authorized terminal list 230.

The authorized terminal list 230 may be maintained in any suitable form in any suitable memory. Also, the authorized terminal list 230 may be configured and re-configured from time to time by the user of the Gateway cell phone 104 and/or by the manufacturer.

As an additional feature, remote answering by a Terminal device may be restricted to certain callers. Thus, the Gateway cell phone 104 may compare call related information (e.g., CallerID information) received with respect to an incoming call, and determine which, if any, of the authorized terminals listed in the authorized terminal list 230 may be allowed to remotely answer that incoming call over the wireless piconet network 110.

Instead of or in conjunction with the authorized terminal list 230, a Terminal device may attempt to become authorized by establishing a presence on the piconet network 110, communicating a particular code such as a personal ID (PIN) to the Gateway cell phone 104 requesting authority to act as a cordless telephone remote handset and remotely answer the incoming call to the Gateway cell phone 104 via the piconet network 110. This request for authorization may be done 'on-the-fly' in an attempt to catch a currently ringing incoming call, or may be done as part of a configuration or pairing of the Terminal with the Gateway cell phone 104. If the Terminal device 102 is another cell phone, the authorized terminal list 230 may maintain the cell phone number of that Terminal device 102, allowing it to remotely answer incoming calls to the Gateway cell phone 104.

Both the Gateway cell phone 104 and the Terminal 102 may include both the PSTN Gateway role 250 and the Terminal role 260 shown in FIG. 2, allowing either device 104 to act as a Gateway and either device to act as a Terminal.

An exemplary application of use of a Gateway cell phone 104 (e.g., a husband's) and a Terminal cell phone 102 (e.g., a wife's). The husband's Gateway cell phone 104 begins ringing in the husband's briefcase, which is in the back seat of the car. It may be more convenient for the wife to take out her Terminal cell phone 102 cell phone and remotely answer the husband's Gateway cell phone 104 more quickly than it would be to fetch the briefcase in the back seat of the car.

In accordance with the Cordless Telephony profile, any or all authorized Terminal devices 102 may be contacted when the Gateway cell phone 104 receives an incoming call, to allow any or all of the Terminal devices 102 to also ring. Preferably, the ring type of the Terminal device acting as a remote handset to a Gateway cell phone 104 is distinctive from the ring otherwise produced when an incoming call goes directly to the Terminal device in an otherwise conventional manner. Moreover, the Terminal device(s) may be allowed to ring even while the Gateway cell phone 104 is in a silent ring or no ring mode. Moreover, the Terminal devices can be configured to audibly ring differently depending on which of a plurality of Gateway cell phones may be receiving an incoming call.

The present invention may be utilized for remote initiation of a telephone call, as well as remote answering of an incoming call to a cell phone. Moreover, it allows for inexpensive Terminal devices to tap into advanced features of more expensive Gateway cell phones, without the need to implement the hardware and/or software for the features themselves in the Terminal device.

The authorized terminal list 230 may be expanded to include enable/disable configuration for allowing some Terminal devices 102 to access certain features in the Gateway cell phone 104, while disallowing access to other features. For instance, some Terminal devices may be capable (or allowed) to answer incoming calls to a Gateway cell phone 104, but not to initiate calls from the Gateway cell phone 104.

The present invention also provides an interface between devices having differing telephony standards. For instance, the invention can connect a US cell phone (e.g., IS-41 standard) to a European cell phone (e.g., GSM standard) network via a BLUETOOTH connection to a GSM Gateway cell phone. Likewise, it can connect a TDMA phone to a CDMA network.

Also, in accordance with the principles of the present invention, two different cell phones with two different telephone numbers can each be configured as a BLUETOOTH extension of the other.

The present invention has application in any piconet device, including cell phones, laptop computers, cordless telephones, etc.

While the invention has been described with reference to the exemplary preferred embodiments thereof, those skilled in the art will be able to make various modifications to the described embodiments of the invention without departing from the true spirit and scope of the invention.

What is claimed is:

1. A cellular telephone, comprising:
    a cellular telephone module;
    a piconet front end; and
    a cordless telephone gateway module configured to provide a cellular-telephone-to-piconet-network gateway role, said cordless telephone gateway module being in communication with said cellular telephone module and with said piconet front end;
    wherein said cordless telephone gateway module is configured, in the cellular-telephone-to-piconet-network gateway role, to allow an incoming call to said cellular telephone to be automatically answered over a piconet network by a remote telephone piconet device instead of by said cellular telephone and to selectively audibly ring said remote telephone piconet device based on incoming call-related information.

2. The cellular telephone according to claim 1, wherein said cordless telephone gateway module is further configured to provide a cordless telephone terminal role in addition to said cordless telephone gateway role.

3. The cellular telephone according to claim 2, wherein said cordless telephone module is configured, in said cordless telephone terminal role, to allow said cellular telephone automatically to connect to a cordless telephone gateway over a piconet network to answer an incoming call established by said cordless telephone gateway.

4. The cellular telephone according to claim 1, wherein:
    said piconet front end is a BLUETOOTH device.

5. The cellular telephone according to claim 1, wherein:
    said cellular-telephone-to-piconet-network gateway role conforms with BLUETOOTH device standards.

6. The cellular telephone according to claim 1, wherein:
    said remote telephone piconet device is another cellular telephone.

7. The cellular telephone according to claim 1, further comprising:

an authorized terminal list including unique identification of at least one remote telephone piconet device permitted to answer incoming calls to said cellular telephone.

8. The cellular telephone according to claim 1, wherein:
said piconet network includes a scatternet connection.

9. The cellular telephone according to claim 1, wherein the ring type of said remote telephone piconet device acting as a remote handset to said cellular telephone is distinctive from the ring otherwise produced when an other incoming call goes directly to said remote telephone piconet device.

10. The cellular telephone according to claim 1, wherein said remote telephone piconet device is allowed to ring even while said cellular telephone is in a silent-ring or no-ring mode.

11. The cellular telephone according to claim 1, wherein said remote telephone piconet device is configured to audibly ring differently depending on which of a plurality of cellular telephones is receiving said incoming call.

12. A method of remotely answering an incoming call to a cellular telephone over a wireless piconet network, the method comprising:
establishing a piconet network including said cellular telephone and a remote piconet device in direct communication, said cellular telephone comprising a piconet front end and being adaptable to operate as a cellular-telephone-to-piconet-network gateway;
selectively audibly ringing said remote telephone piconet device based on incoming call-related information; and
allowing said incoming call to said cellular telephone to be automatically answered over a piconet network by another telephone device instead of by said cellular telephone.

13. The method according to claim 12, further comprising:
establishing in said cellular telephone a list of authorized remote telephone piconet devices permitted to remotely answer incoming calls to said cellular telephone.

14. The method according to claim 12, wherein:
said cellular telephone is further configured to operate as a cordless telephone terminal and as said cellular-telephone-to-piconet-network gateway, and
the method further comprises said cellular telephone automatically connecting as a cordless telephone terminal to a cordless telephone gateway over said piconet network to answer an incoming call established by said cordless telephone gateway.

15. The method according to claim 12, wherein the ring type of said remote telephone piconet device acting as a remote handset to said cellular telephone is distinctive from the ring otherwise produced when an other incoming call goes directly to said remote telephone piconet device.

16. The method according to claim 12, wherein said remote telephone piconet device is allowed to ring even while said cellular telephone is in a silent-ring or no-ring mode.

17. The method according to claim 12, wherein said remote telephone piconet device is configured to audibly ring differently depending on which of a plurality of cellular telephones is receiving said incoming call.

18. A method of allowing a remote telephone piconet device to answer an incoming call to a cellular telephone in communication with said piconet device, comprising:
passing incoming call-related information from said cellular telephone receiving an incoming call directly to said remote piconet device over a wireless piconet, said cellular telephone being adaptable to operate as a cellular-telephone-to-piconet-network gateway and comprising a piconet front end;
selectively audibly ringing said remote piconet device based on said incoming call-related information; and
allowing said incoming call to said cellular telephone to be automatically answered over a piconet network by another telephone device instead of by said cellular telephone.

19. The method according to claim 18, wherein said remote telephone piconet device is allowed to ring even while said cellular telephone is in a silent-ring or no-ring mode.

20. The method according to claim 18, wherein said remote telephone piconet device is configured to audibly ring differently depending on which of a plurality of cellular telephones is receiving said incoming call.

21. The method according to claim 18, wherein the ring type of said remote telephone piconet device acting as a remote handset to said cellular telephone is distinctive from the ring otherwise produced when an other incoming call goes directly to said remote telephone piconet device.

22. The method according to claim 18, further comprising:
audibly ringing said cellular telephone together with said remote telephone piconet device in response to said receipt of said incoming call related information by said cellular telephone.

23. The method according to claim 18, further comprising:
audibly ringing at least two remote telephone piconet devices in response to receipt of said incoming call information by said cellular telephone.

24. The method according to claim 18, wherein:
said wireless piconet is a BLUETOOTH piconet network.

25. The method according to claim 18, wherein:
said incoming call related information comprises callerID information.

26. Apparatus for allowing a remote telephone piconet device to answer an incoming call to a cellular telephone in communication with said piconet device, comprising:
means for passing incoming call-related information from said cellular telephone receiving an incoming call directly to said remote telephone piconet device over a wireless piconet, said cellular telephone being adaptable to operate as a cellular-telephone-to-piconet-network gateway and comprising a piconet front end;
means for selectively audibly ringing said remote piconet device based on said incoming call-related information; and
means for allowing said incoming call to said cellular telephone to be automatically answered over a piconet network by another telephone device instead of said cellular telephone.

\* \* \* \* \*